United States Patent [19]

Schmidt

[11] Patent Number: 4,610,186
[45] Date of Patent: Sep. 9, 1986

[54] CUTTING INSERT FOR THREAD CUTTING

[75] Inventor: Erik Schmidt, Ludvika, Sweden

[73] Assignee: Seco Tools AB, Fagersta, Sweden

[21] Appl. No.: 816,331

[22] Filed: Jan. 6, 1986

Related U.S. Application Data

[62] Division of Ser. No. 580,750, Feb. 16, 1984, Pat. No. 4,572,713.

[30] Foreign Application Priority Data

Feb. 21, 1983 [SE] Sweden ................................ 8300933

[51] Int. Cl.[4] .............................................. B23G 5/00
[52] U.S. Cl. .................................................. 76/101 R
[58] Field of Search ............................... 407/113–117, 407/120, 42, 103; 10/101 R, 111; 408/215–222; 76/101 R

[56] References Cited

U.S. PATENT DOCUMENTS

| | | | |
|---|---|---|---|
| 2,004,333 | 6/1935 | Maurer | 10/111 |
| 3,126,560 | 3/1964 | Jennings | 408/218 |
| 3,755,868 | 9/1973 | LaForge et al. | 407/113 |
| 3,776,655 | 12/1973 | Urbanic | 10/111 |
| 3,812,547 | 5/1974 | Reich | 407/120 |
| 3,875,631 | 4/1975 | Malinchak | 407/113 |
| 4,281,430 | 8/1981 | Hellnick | 407/113 |

*Primary Examiner*—Roscoe V. Parker
*Attorney, Agent, or Firm*—Burns, Doane, Swecker & Mathis

[57] ABSTRACT

A thread cutting insert comprises parallel side surfaces and two mutually adjacent edge surfaces, which are provided with cutting teeth and extend between the side surfaces. For purposes of minimizing the amount of material ground away from a blank during manufacture of the cutting insert this material comprises surface portions separated from each other by the cutting teeth.

3 Claims, 5 Drawing Figures

U.S. Patent   Sep. 9, 1986   Sheet 1 of 2   4,610,186 ically only a small amount of material has been removed from two adjacent sides of the blank during the manufacture of the cutting insert, which is contrary to the case with the prior art cutting insert depicted in FIG. 5. Accordingly, the amount of grinding work is minimized and planar chips are obtained during a period of the cutting operation as large as possible, as previously described with reference to FIG. 4.

CUTTING INSERT FOR THREAD CUTTING

This application is a division of application Ser. No. 580,750 filed Feb. 16, 1984 and now U.S. Pat. No. 4,572,713.

BACKGROUND OF THE INVENTION

The present invention relates to a thread cutting insert of indexable type and to a method of manufacturing the insert. More precisely, the invention relates to a thread cutting insert of the type comprising parallel first and second side surfaces and a plurality of edge surfaces extending therebetween, wherein first and second ones of the edge surfaces provide first supporting surface means intended to rest against second supporting surface means on an insert-carrier, a third and a fourth mutually adjacent edge surface of the remaining edge surfaces are provided with cutting teeth, and wherein the rake face of the cutting teeth on the third edge surface is provided on the first side surface and the rake face of the cutting teeth on the fourth edge surface is provided as the second side surface so that the cutting teeth on the one of the third and fourth edge surfaces which is inactive during cutting by means of the other one of the third and fourth edge surfaces can be brought into cutting position by turning the cutting insert about an imaginary line which extends between the third and fourth edge surfaces.

In cutting inserts of the above type the cutting teeth are formed by grinding away material from a blank having planar edge surfaces. The object of the invention is to minimize the amount of material removed from two adjacent edge surfaces on such a blank. The invention seeks in particular to provide as many cutting teeth as possible on a square or rhombic blank of a predetermined size.

These and other objects of the invention have been attained by giving the invention the characterizing features stated in the appending claims.

BRIEF DESCRIPTION OF THE DRAWING

The invention is described in detail in the following with reference to the accompanying drawings in which one embodiment is shown by way of example. It is to be understood that this embodiment is only illustrative of the invention and that various modifications thereof may be made within the scope of the claims.

In the drawings.

DETAILED DESCRIPTION OF A PREFERRED EMBODIMENT OF THE INVENTION

Figure 1:
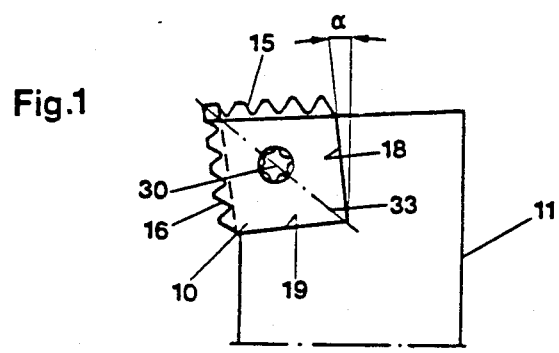
FIG. 1 shows a side view of an insert-carrier provided with a thread cutting insert according to the invention.
Figure 3:
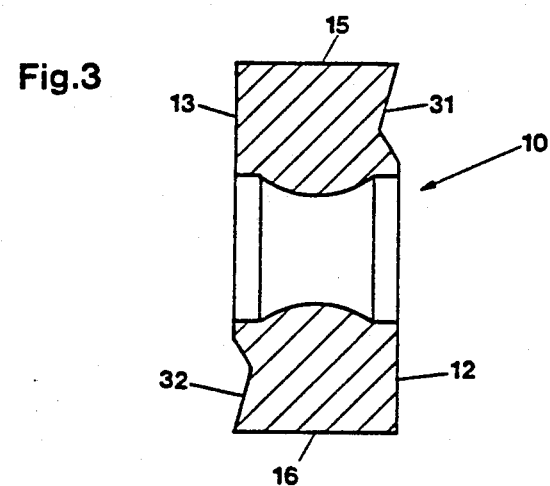
FIG. 3 is a section taken on the line III—III in FIG. 2.

In FIG. 1, a thread cutting insert 10 is secured to a tool holder 11 by means of a screw 30. The cutting insert 10 has mutually parallel side surfaces 12,13 and edge surfaces 14,15,16,17 extending therebetween. The edge surfaces 14,17 are designed as supporting surfaces intended to rest against corresponding supporting surfaces 18,19 on the tool holder 11. The edge surfaces 15,16 are provided with cutting teeth 20-24 and 25-29, respectively. A recess 31 acting as a chipbreaker is provided in the side surface 12 in connection with the cutting teeth 20-24 and a recess 32 acting as a chipbreaker is provided in the side surface 13 in connection with the cutting teeth 25-29. In the position of the cutting insert 10 shown in FIG. 1 the cutting teeth 20-24 are in cutting position. The cutting teeth 25-29 can be brought into cutting position by turning the cutting insert 10 about an imaginary symmetry line 33 extending between the edge surfaces 15,16.

Figure 4:
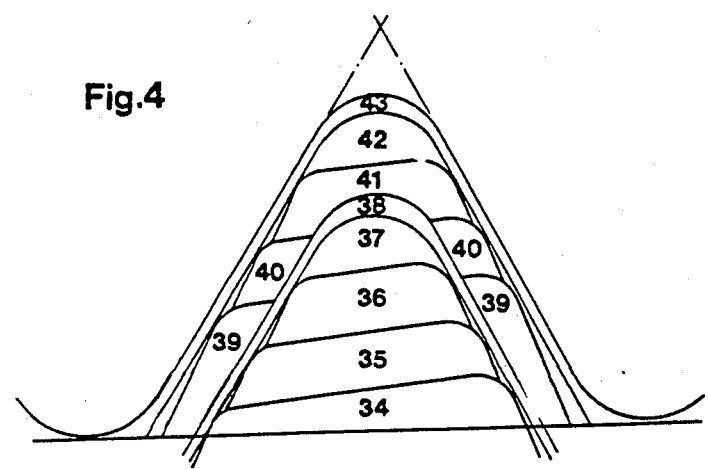
FIG. 4 illustrates the shape of the chip obtained by the different cutting teeth.

The cutting teeth 20-24 and 25-29, respectively, are formed with a height which increases in the direction away from the intersection between the edge surfaces 15,16. That is, the recesses 47-50 and 51-54 between successive teeth become progressively deeper in a direction away from the intersection of the edges 15, 16. For purposes of obtaining planar chips during a period of the cutting operation as large as possible the cutting teeth 20-22 and 25-27 adjacent to the intersection between the edge surfaces 15,16 are formed with flattened top portions. The final thread profile is suitably made in two steps by means of the cutting insert shown in FIG. 2, wherein in the first step the cutting teeth 20-24 cut away the portions denoted by 34-38 in FIG. 4 and in the second step the cutting teeth 20-24 cut away the portions denoted by 39-43. In the preferred embodiment the cutting depth can be maximized due to the fact that planar chips are more easily deformed to desired chip form than V-shaped chips and due to the fact that the heat generated during the cutting operation is more efficiently conducted away from the tip of the cutting teeth when planar chips are formed than when V-shaped chips are formed.

Figure 2:
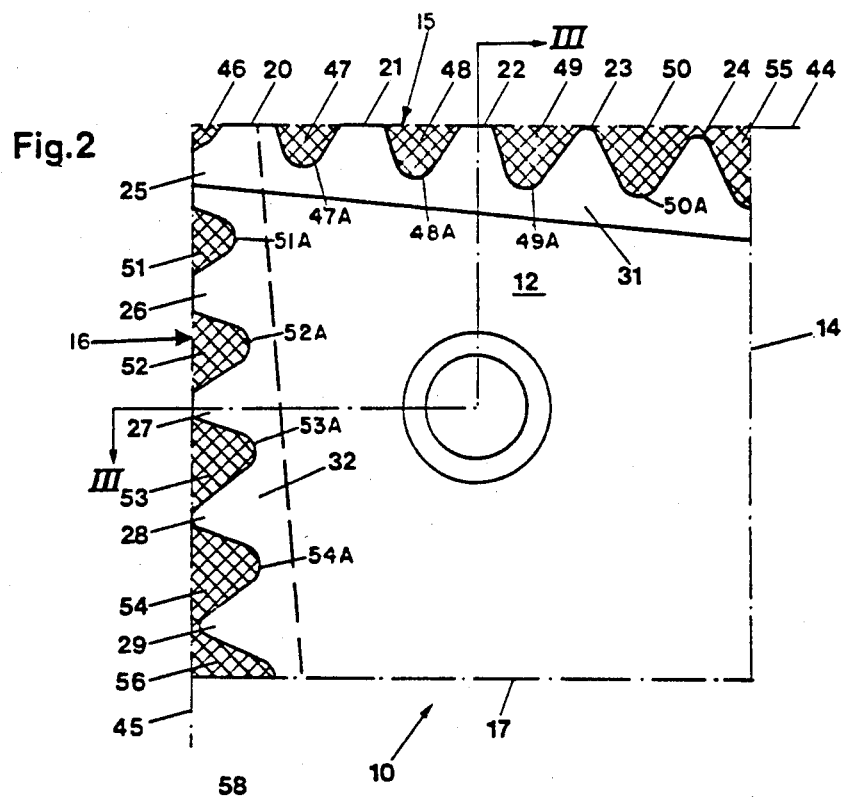
FIG. 2 shows a top view of the cutting insert in FIG. 1.

According to the invention the edge surfaces 15,16 provide between themselves such an included angle that the surface enclosed between the profiles of the edge surfaces 15,16 and two imaginary lines 44,45 comprises surface portions which are separated from each other; the imaginary line 44 being parallel with the edge surface 17 and tangential to at least one of the cutting teeth 20-24, and the imaginary line 45 being parallel with the edge surface 14 and tangential to at least one of the cutting teeth 25-29. In the illustrated embodiment the cutting insert is square, the length of the edge surfaces is in the order of 16 mm, the pitch is in the order of 3 mm, the number of cutting teeth on each of the edge surfaces 15,16 is five, and the imaginary lines 44,45 are tangential to the cutting teeth 20-23 and the cutting teeth 25-28, respectively, which means that the surface portions or recesses 46-54 on both sides of these cutting teeth are mutually separated. Thus, only the enclosed surface portions 50,55 and 54,56 on both sides of the cutting teeth 24 and 29, respectively, are mutually connected by means of a surface portion bridging the tip of the cutting teeth 24,29. Stated in other terms, and as depicted in FIG. 2, the bottoms 47A–50A of the recesses 47-50 along the edge 15 become located closer to the opposing edge 17 as those recesses become located more remote from the corner where the edges 15, 16 intersect (i.e., the upper left-hand corner in FIG. 2). A similar relationship exists in connection with the recesses 51-54 and the edge 14.

In the illustrated embodiment, wherein the cutting insert 10 is manufactured from a square blank, the insert is provided with a supporting surface 17 which is perpendicular to the supporting surface 14. For purposes of minimizing the amount of removed, i.e. ground away, material, the angle between the imaginary lines 44,45 is right or at least substantially right. This means that the cutting insert 10 in the illustrated embodiment is to be mounted in the tool holder 11 in such a way that the entering angle $\alpha$ in FIG. 1 is about 8°. It is believed that the entering angle shall be between 3° and 10° for cutting inserts modified within the scope of inventive concept.

Figure 5:
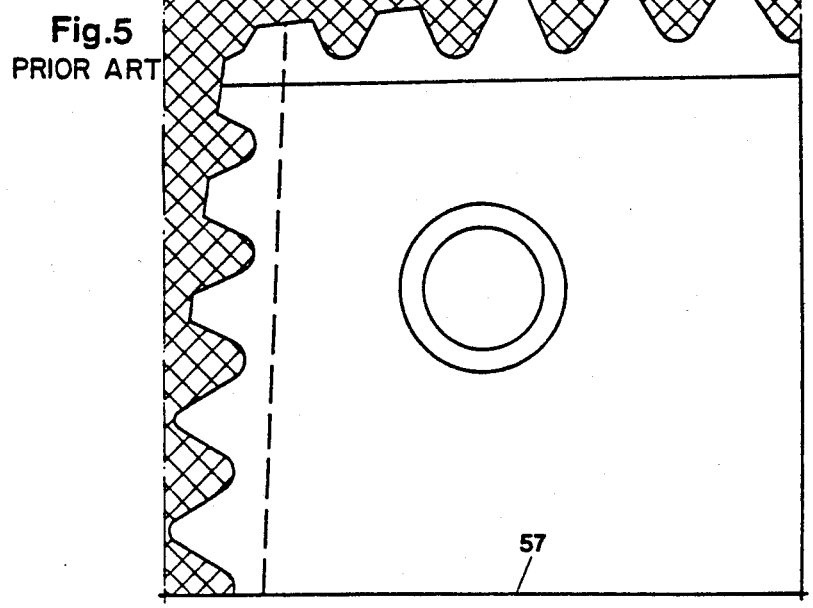
FIG. 5 shows a top view of a prior art thread cutting insert which is manufactured in conventional manner from a square blank.

A cutting insert manufactured in conventional manner from a square blank, see reference numeral 57 in FIG. 5, is mounted in the tool holder with an entering angle of 0°. As is obvious from FIG. 5, the material ground away from the blank forms a large coherent surface 58. When comparing FIG. 5 with FIG. 2 it is obvious that a considerably larger blank is required if the conventional grinding method is used in order to obtain a cutting insert having the same number of teeth.

The invention can also be applied on rhombic cutting inserts, in which case a rhombic blank is chosen having an angle between adjacent edge surfaces of between 75° and 105°.

I claim:

1. A method of making a thread cutting insert of the type comprising parallel first and second side surfaces and at least four edge surfaces extending therebetween, first and second ones of said edge surfaces intersecting and defining first supporting edges adapted to rest against supporting surface means on an insert-carrier, third and fourth ones of said edge surfaces intersecting at a corner of the insert and provided with cutting teeth, a rake face for the cutting teeth on said third edge surface being provided on said first side surface and a rake face for the cutting teeth on said fourth edge surface being provided on said second side surface so that the cutting teeth on the one of said third and fourth edge surfaces which is inactive during cutting by means of the other of said third and fourth edge surfaces can be brought into cutting position by turning the cutting insert about an imaginary symmetry line which bisects an angle formed by said third and fourth edge surfaces, said teeth on each said third and fourth edge surface being separated by recesses which become progressively deeper as said recesses become more remote from said corner, said method including the step of:

removing material from two intersecting edge surfaces of a blank to form said recesses of said third and fourth edge surfaces, said material being removed so as to form said recesses with bottoms which become located progressively closer to the opposing one of said supporting edges as said recesses become more remote from said corner.

2. A method according to claim 1, wherein said removing step includes removing material from two intersecting edge surfaces of a square-shaped blank.

3. A method according to claim 1, wherein said removing step includes removing material from two intersecting edge surfaces of a rhombic-shaped insert having an inclined angle between adjacent edge surfaces of between 75° and 105°.

* * * * *